(12) United States Patent
Soh et al.

(10) Patent No.: US 9,463,757 B2
(45) Date of Patent: Oct. 11, 2016

(54) ELECTRIC JUNCTION BOX

(75) Inventors: Shutoh Soh, Kakegawa (JP); Kenta Kamiya, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 120 days.

(21) Appl. No.: 13/067,860

(22) Filed: Jun. 30, 2011

(65) Prior Publication Data

US 2012/0000686 A1    Jan. 5, 2012

(30) Foreign Application Priority Data

Jul. 2, 2010    (JP) ................................. 2010-151670

(51) Int. Cl.
 *B60R 16/023*    (2006.01)
(52) U.S. Cl.
 CPC ....... *B60R 16/0239* (2013.01); *B60R 16/0238* (2013.01)
(58) Field of Classification Search
 CPC ........................... H05K 7/026; B60R 16/0238
 USPC ............... 174/520, 559, 60, 88 R, 70 C, 50; 248/906, 49; 439/76.2
 See application file for complete search history.

(56) References Cited

U.S. PATENT DOCUMENTS

| | | | | |
|---|---|---|---|---|
| 2,947,800 A | * | 8/1960 | Badeau | H02G 3/0683 174/665 |
| 6,034,326 A | * | 3/2000 | Jorgensen | 174/660 |
| 6,338,657 B1 | * | 1/2002 | Harper et al. | 439/692 |
| 6,830,225 B2 | | 12/2004 | Kato | |
| 7,195,515 B2 | * | 3/2007 | Kanamaru | 439/465 |
| 7,378,592 B2 | * | 5/2008 | Suzuki et al. | 174/72 A |
| 7,964,796 B2 | * | 6/2011 | Suzuki | 174/72 C |
| 8,426,737 B2 | * | 4/2013 | Maebashi | 174/152 R |
| 2002/0057360 A1 | * | 5/2002 | Abe | H04N 5/2252 348/373 |
| 2003/0111579 A1 | * | 6/2003 | Miyamoto et al. | 248/67.5 |
| 2007/0049090 A1 | * | 3/2007 | Kaneko | B60R 16/0239 439/271 |
| 2008/0009175 A1 | * | 1/2008 | Kamenoue | B60R 16/0222 439/397 |
| 2010/0147584 A1 | | 6/2010 | Suzuki | |

FOREIGN PATENT DOCUMENTS

| | | |
|---|---|---|
| EP | 0865131 A1 | 9/1998 |
| EP | 0872936 | 10/1998 |

(Continued)

OTHER PUBLICATIONS

JP 2004-072848 English Translation; Inventor: Hiroyuki; Publication Date Apr. 3, 2004.*

(Continued)

*Primary Examiner* — Angel R Estrada
*Assistant Examiner* — Pete Lee
(74) *Attorney, Agent, or Firm* — Locke Lord LLP

(57) ABSTRACT

An electric junction box 1 includes: a box main body 2; and a tubular guide portion 6 projecting from the box main body 2 and guiding a plurality of electric wires 7 to an outside of the box main body 2. While the electric wires 7 are passed through the guide portion 6, a fixing member 8 is continuously wound from the guide portion 6 to the electric wires 7. The guide portion 6 is provided with an expanded portion 67 gradually expanded toward an outside of the guide portion 6 as the guide portion 6 is extended from the box main body 2 to an end portion away from the box main body 2.

9 Claims, 7 Drawing Sheets

(56) References Cited

FOREIGN PATENT DOCUMENTS

| JP | 07-115717 A | 5/1995 |
|---|---|---|
| JP | 10336844 A | 12/1998 |
| JP | 2004 072848 A | 3/2004 |
| JP | 2004-236449 A | 8/2004 |
| JP | 2008-236865 A | 10/2008 |
| JP | 2010-136468 A | 6/2010 |

OTHER PUBLICATIONS

Foreign reference JP Patent 4-93423 published in Aug. 13, 1992.*
European Search Report for European Patent Application No. EP 11171694.0 issued Oct. 19, 2011.
Chinese Office Action issued on Sep. 27, 2013 for corresponding Chinese Patent Application No. 201110183706.2.
Japanese Office Action mailed on Apr. 22, 2014 for corresponding Japanese Patent Application No. 2010-151670.

* cited by examiner

ELECTRIC JUNCTION BOX

CROSS REFERENCE TO RELATED APPLICATIONS

This application is on the basis of Japanese Patent Application No. 2010-151670, the contents of which are hereby incorporated by reference.

BACKGROUND OF THE INVENTION

1. Field of the Invention

The present invention relates to an electric junction box attached to an inside of an engine room of a vehicle.

2. Description of the Related Art

Various electronic devices are mounted on a vehicle as a moving object. For supplying electric power to these various electronic devices, an electric junction box composed of intensive electric parts such as connector, relay, and fuse is disposed on a proper position between a battery and the electronic devices in the vehicle.

Incidentally, the electric junction box is also referred to as a junction block, a fuse block, or a relay box. In this description, these junction block, fuse block, and relay box are collectively called as the electric junction box.

FIG. 7 is a perspective view showing a part of conventional electric junction box. FIG. 8 is an explanatory view showing schematically a condition that a plurality of electric wires is passed through a guide portion of the conventional electric junction box. FIG. 9 is an explanatory view showing schematically a condition that an adhesive tape is wound around the conventional guide portion shown in FIG. 8. The conventional electric junction box 101 shown in FIGS. 7 to 9 includes: a box main body 102 formed in a box shape, and received various electric parts (not shown) therein; and a tubular guide portion 106 projecting from the box main body 102, and guiding a plurality of electric wires 7 to an outside of the box main body 102.

As shown in FIGS. 8 and 9, while the plurality of electric wires 7 is passed through an inside of the guide portion 106, an adhesive tape 8 as a fixing member is continuously wound around an outer periphery of the guide portion 106 and the electric wires 7 from the guide portion 106 to the electric wires 7 without any gap.

Further, the guide portion 106 is formed in a cylinder shape having the same diameter along a whole length in a longitudinal direction of the guide portion 106 (for example, see Patent Document 1).

[Patent Document 1] JP, A, H07-115717

However, in the conventional electric junction box 101, there is a problem described below. Namely, because the guide portion 106 of the conventional electric junction box is formed in a cylinder shape having the same diameter along the whole length in a longitudinal direction of the guide portion 106, for example, when the above-described vehicle is vibrated while running, the adhesive tape 8 continuously wound from the guide portion 106 to the electric wires 7 tends to be moved (slipped) in a direction away from the box main body 102 along the longitudinal direction of the guide portion 106. Therefore, a gap may be generated between the guide portion 106 and the electric wires 7 passing through the inside of the guide portion 106, and there is a fear that water may enter an inside of the box main body 102 via the gap.

Accordingly, an object of the present invention is to provide an electric junction box having an enhanced watertight performance by preventing a fixing member continuously wound from a guide portion to a plurality of electric wires from being moved (slipped).

SUMMARY OF THE INVENTION

In order to attain the first object, according to the present invention, there is provided an electric junction box including:

a box main body;

a tubular guide portion projecting from the box main body and guiding a plurality of electric wires to an outside of the box main body, said guide portion having an expanded portion gradually expanded toward an outside of the guide portion as the guide portion is extended from the box main body to a tip portion away from the box main body; and a fixing member continuously wound from the guide portion to the electric wires while the electric wires are passed through an inside of the guide portion.

Preferably, the guide portion is provided with a rib projected outward from the guide portion for preventing the fixing member from being dislocated, and the rib is separated from the tip portion away from the box main body.

These and other objects, features, and advantages of the present invention will become more apparent upon reading of the following detailed description along with the accompanied drawings.

DETAILED DESCRIPTION OF THE PREFERRED EMBODIMENTS

Figure 1:
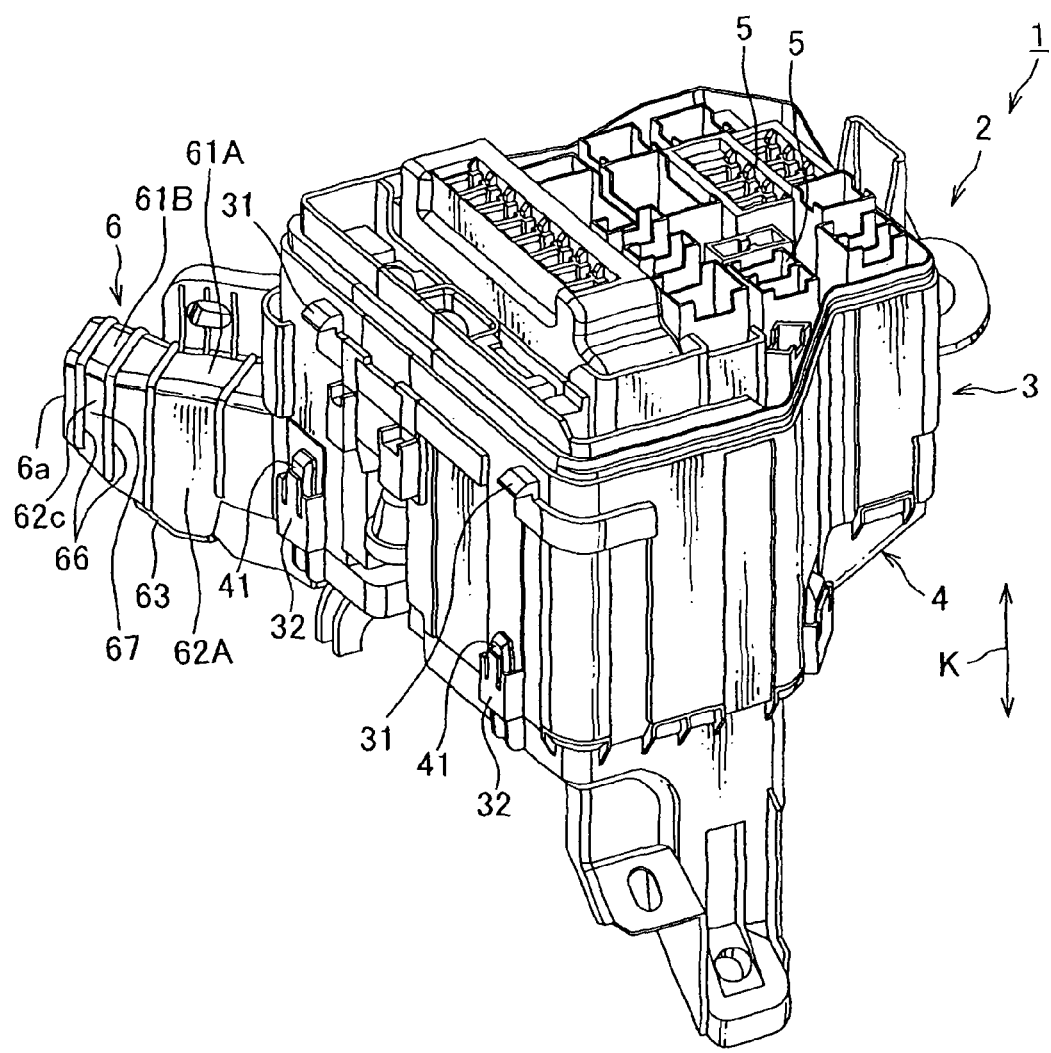
FIG. 1 is a perspective view showing an electric junction box according to an embodiment of the present invention.

Hereinafter, an electric junction box 1 according to an embodiment of the present invention will be explained with reference to FIGS. 1 to 6. The electric junction box 1 shown in such as FIG. 1 is attached to an engine room of a vehicle for supplying electric power to various electronic parts mounted on the vehicle. Incidentally, in this description, junction block, fuse block, and relay box are collectively called as the electric junction box 1.

Figure 5:
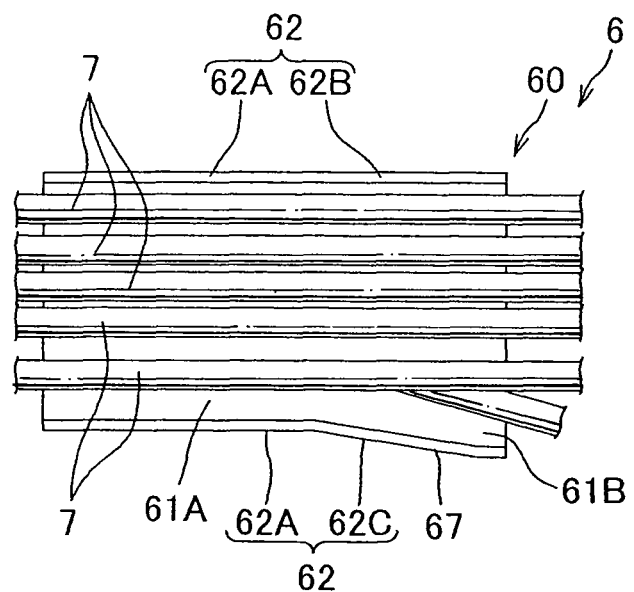
FIG. 5 is an explanatory view schematically showing a condition that the electric wires are passed through the guide portion shown in FIG. 3.
Figure 6:
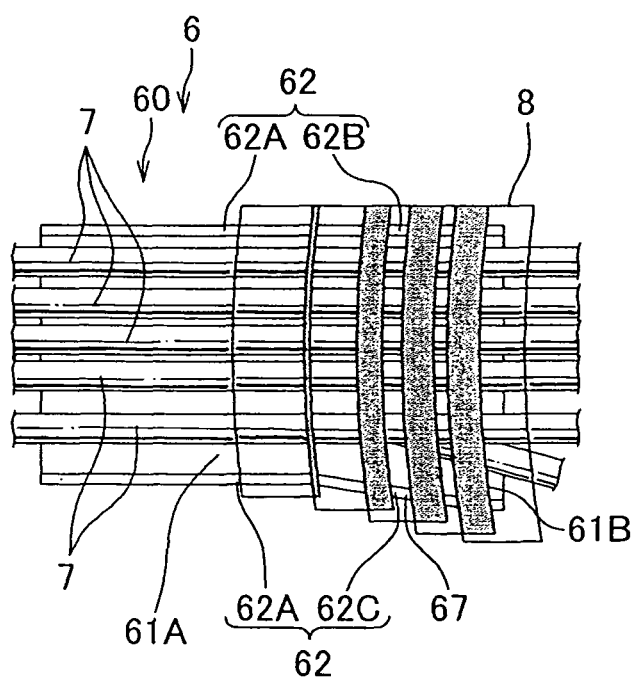
FIG. 6 is an explanatory view schematically showing a condition that an adhesive tape is wound around the guide portion shown in FIG. 5.
Figure 7:
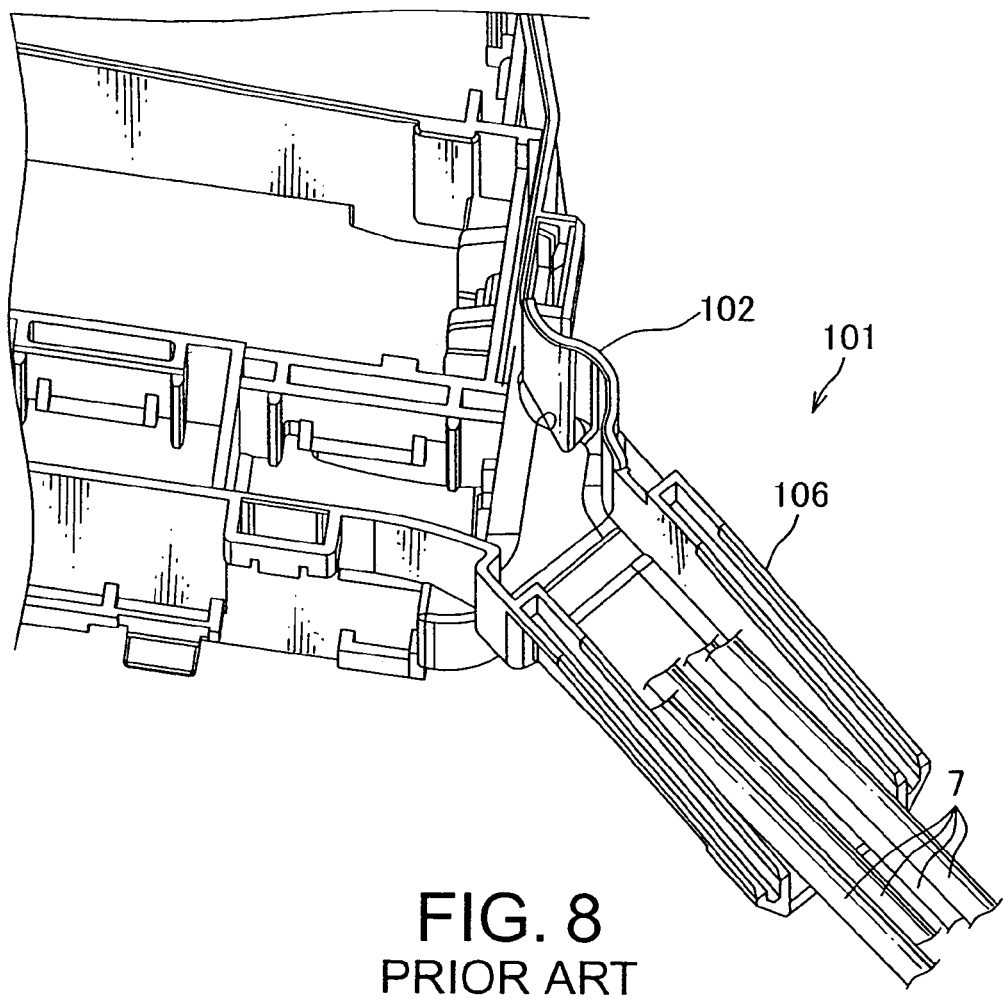
FIG. 7 is a perspective view showing a part of a conventional electric junction box.
Figure 8:
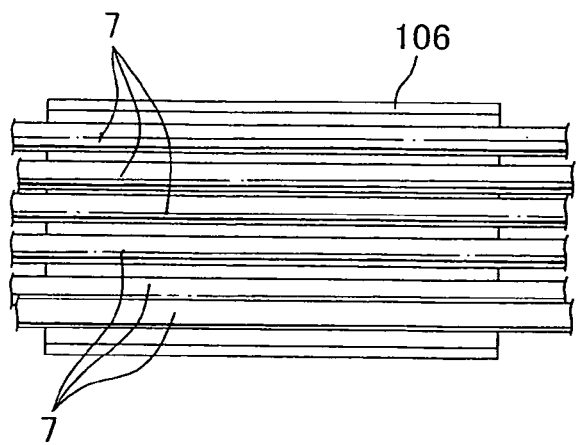
FIG. 8 is an explanatory view schematically showing a condition that the electric wires are passed through a guide portion as a component of the conventional electric junction box shown in FIG. 7.
Figure 9:
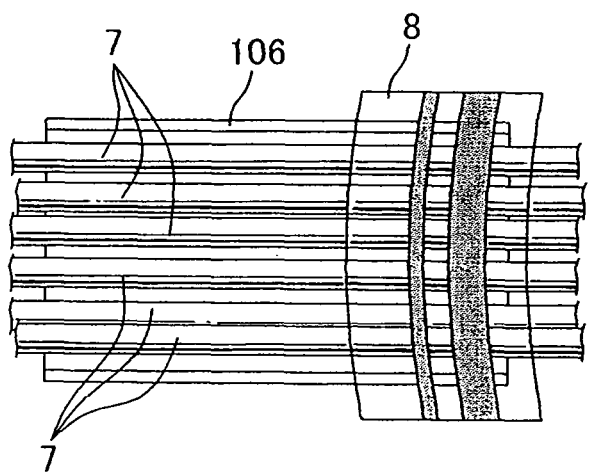
FIG. 9 is an explanatory view schematically showing a condition that the adhesive tape is wound around the conventional guide portion shown in FIG. 8.

As shown in FIG. 1, the electric junction box 1 includes: a box main body 2 for receiving a plurality of electric parts; a tubular guide portion 6 projecting from the box main body 2 and guiding a plurality of electric wires 7 to an outside of the box main body 2; and a rib 66 provided on the guide portion 6 and projected outward from the guide portion 6. Further, as shown in FIGS. 5 and 6, while the plurality of electric wires 7 is passed through an inside of the guide portion 6, an adhesive tape 8 as a fixing member is continuously wound around an outer periphery of the guide portion 6 and the electric wires 7 from the guide portion 6 to the electric wires 7 without any gap. Further, in FIGS. 5 and 6, the rib 66 is omitted.

Figure 2:
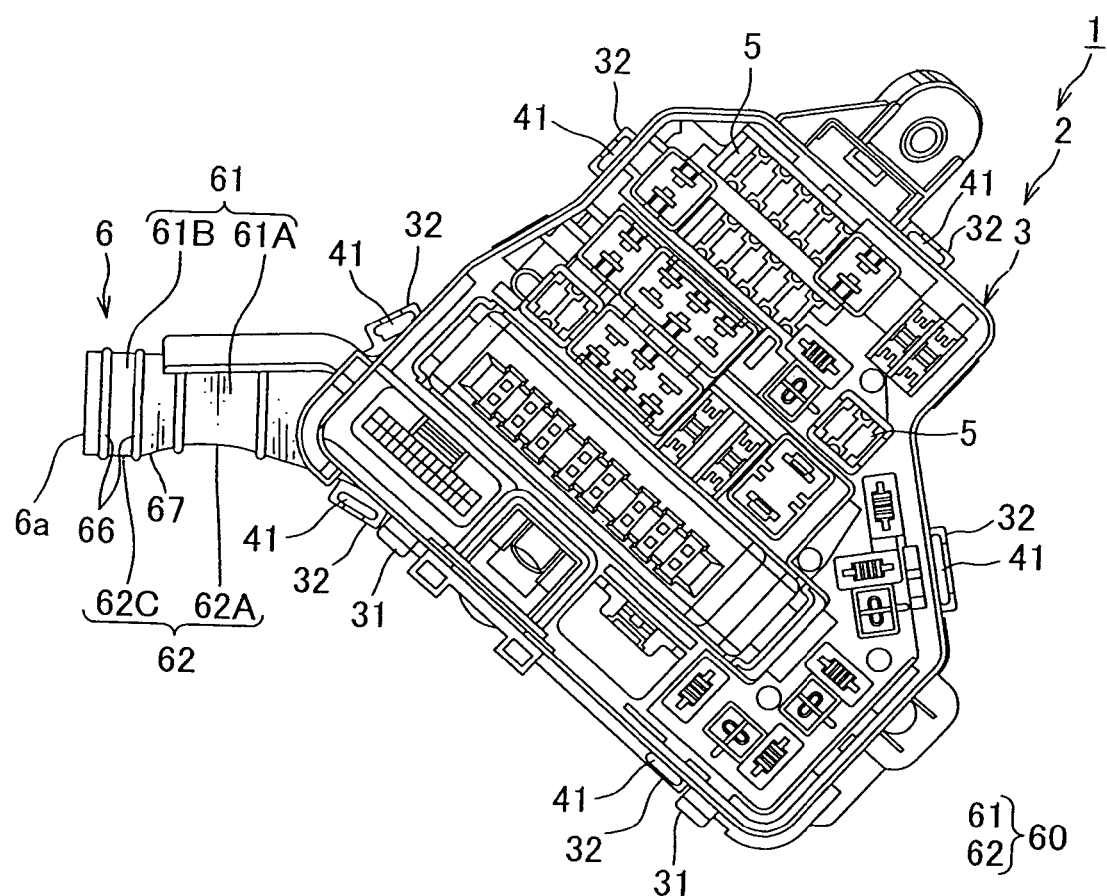
FIG. 2 is a top view showing the electric junction box shown in FIG. 1.

As shown in FIGS. 1 and 2, the box main body 2 includes: a tubular main body portion 3; an upper cover (not shown) detachably attached to the main body portion 3 for covering an upper side of the main body portion 3; and a lower cover 4 detachably attached to the main body portion 3 for covering a lower side of the main body portion 3. Further, a plurality of electric parts is mounted on a synthetic-resin-made cassette block 5 and received in the box main body 2. Incidentally, in FIG. 1, the upper cover is removed. Further, an arrow K shown in FIG. 1 indicates a direction that the cover 4 is moved close to or away from the main body portion 3.

The main body portion 3 is made of synthetic resin, and formed by well-known injection molding. The main body portion 3 is provided with an upper-side lock-receiving portion 31 for locking with a later-described locking portion of the upper cover, and a lower-side lock-receiving portion 32 for locking with a later-described locking portion 41 of the lower cover 4.

The upper cover is made of insulating synthetic resin, and formed in a tubular shape having a bottom plate by well-known injection molding. The lower cover 4 is provided with a plurality of locking portions 41.

While one ends of the electric wires 7 are connected to the electric parts, the other ends of the electric wires 7 are passed through the guide portion 6, thereby the other ends of the electric wires 7 are guided to an outside of the box main body 2. Further, an inside of the box main body 2 is communicated with an outside of the box main body 2 via the guide portion 6. Further, a longitudinal direction of the guide portion 6 is parallel to a longitudinal direction of the electric wires 7. Further, an adhesive tape 8 is continuously wound around an outer periphery of later-described wound portions 61B, 62B, 62C, 65 and the electric wires 7 without any gap.

Figure 3:
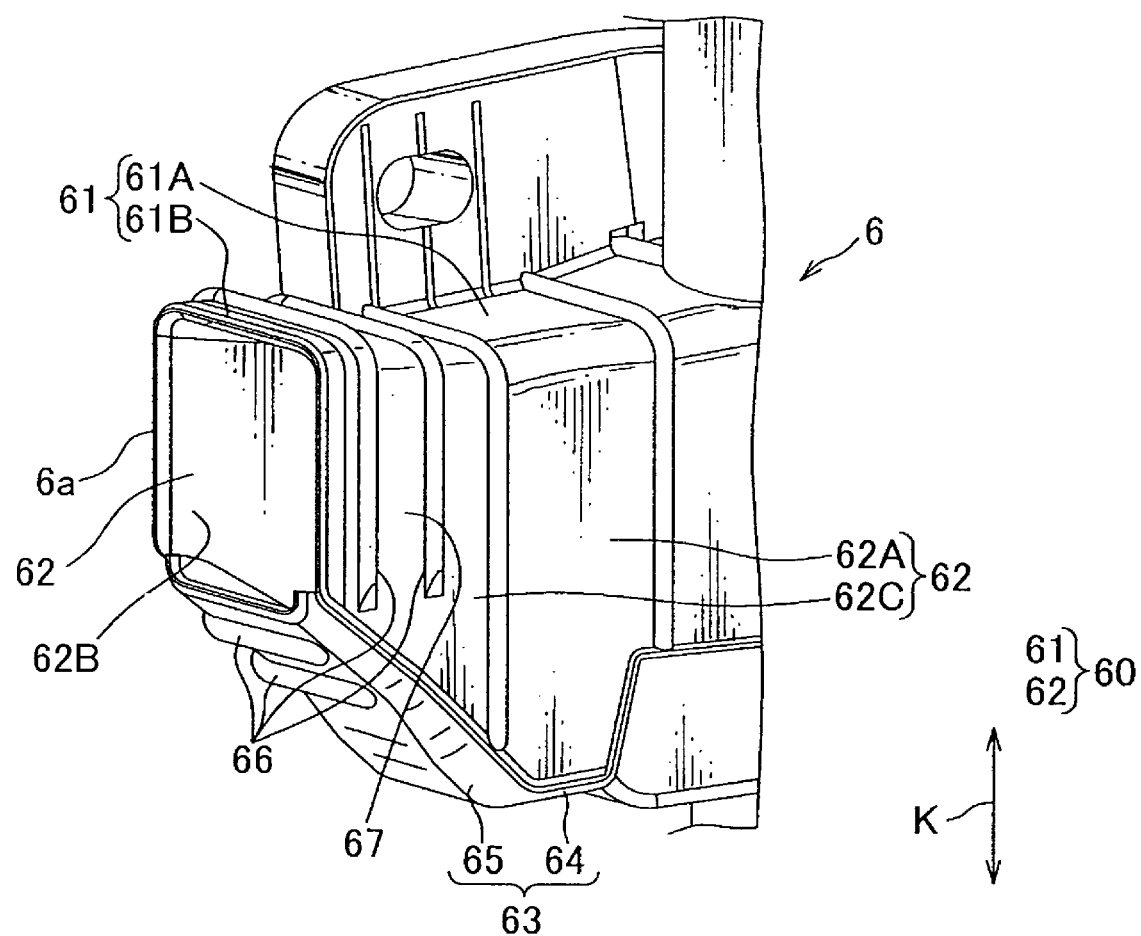
FIG. 3 is an enlarged view showing a guide portion as a component of the electric junction box shown in FIG. 1.

As shown in FIGS. 2 and 3, the guide portion 6 includes: a gutter-shaped portion 60 extended from an edge of a bottom side of the main body portion 3; and a bottom wall portion 63 extended from an edge of the lower cover 4 which is overlapped with the edge of the bottom side of the main body portion 3. Further, when the lower cover 4 is attached to the main body portion 3, edges of the gutter-shaped portion 60 and the bottom wall portion 63 in a circumferential direction are overlapped with each other to compose the rectangular-tubular-shaped guide portion 6.

Figure 4:
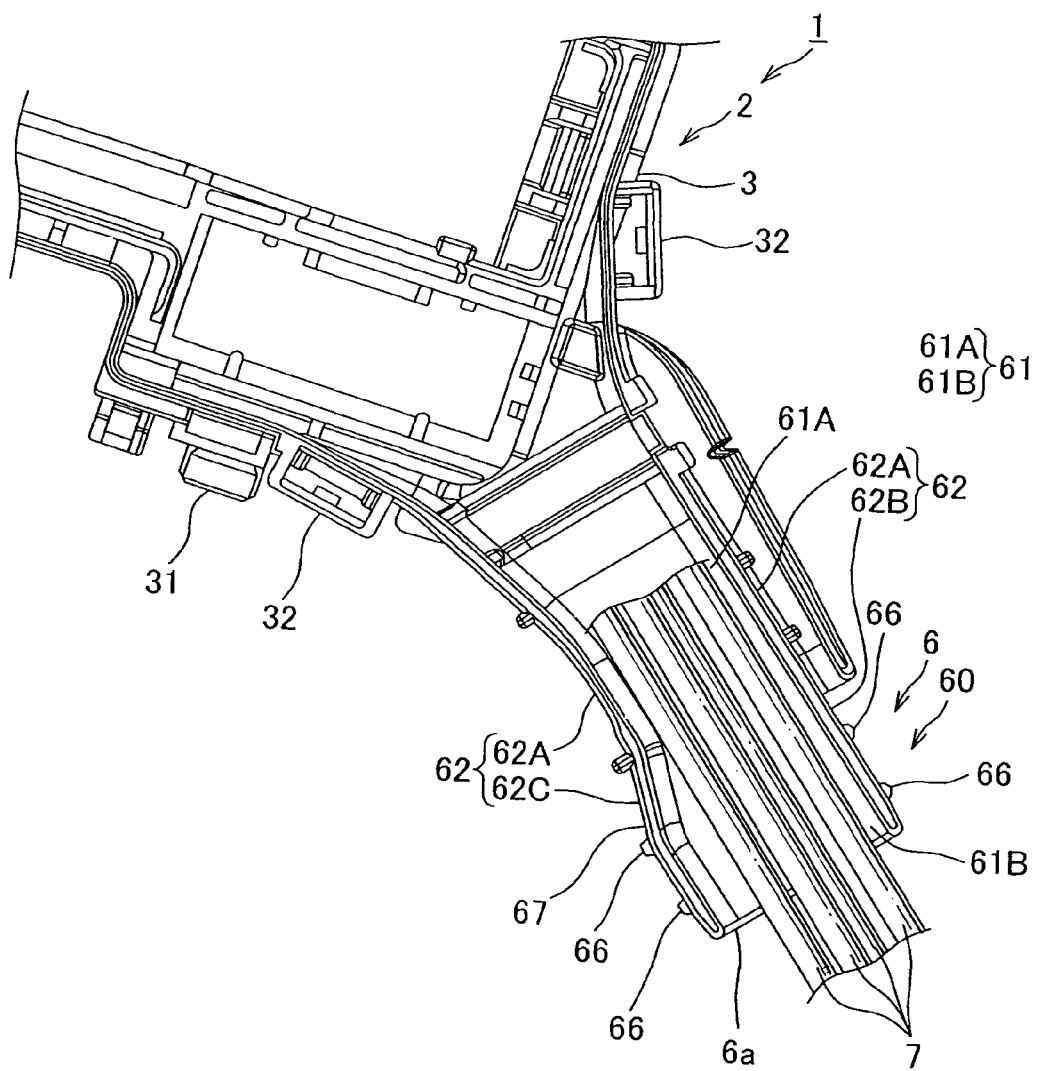
FIG. 4 is a bottom view showing a condition that a plurality of electric wires is passed through a gutter-shaped portion extended from a main body portion as a component of the electric junction box shown in FIG. 1.

As shown in FIGS. 3 and 4, the gutter-shaped portion 60 includes: a plate-shaped ceiling wall portion 61; and a pair of plate-shaped side wall portions 62 extended from both edges of the ceiling wall portion 61 in a circumferential direction, and arranged with a gap to each other. FIG. 4 is a bottom view showing the main body portion 3 without the lower cover 4, and the gutter-shaped portion 60 extended from the main body portion 3.

As shown in FIG. 3, the ceiling wall portion 61 is provided at the upper cover side in the arrow K direction. Further, the ceiling wall portion 61 includes: a base portion 61A continued to the main body portion 3; and a first wound portion 61B continued to a side of the 61A away from the box main body 2. The first wound portion 61B is inclined in the arrow K direction approaching the upper cover (a direction separating from the lower cover 4) as the first wound portion 61B extends from a base end of the first wound portion 61B near the box main body 2 to a tip portion 6a of the first wound portion 61B away from the box main body 2.

The pair of side wall portions 62 respectively includes: a pair of base portions 62A continued to the base portion 61A; and a pair of second wound portions 62B, 62C continued to both the base portions 62A and the first wound portion 61B. Respective edges of the second wound portions 62B, 62C away from the ceiling wall portion 61 are inclined in the arrow K direction approaching the ceiling wall portion 61 as the edges extend from base ends of the second wound portions 62B, 62C near the box main body 2 to the tip portion 6a.

Further, the second wound portion 62C positioned at a front side of FIGS. 1 and 3 of the pair of second wound portions 62B, 62C is provided with an expanded portion 67 gradually expanded toward an outside of the guide portion 6 as the second wound portion 62C is extended from the base end of the second wound portion 62C to the tip portion 6a. Further, as shown in FIGS. 4 and 5, because the second wound portion 62C is provided with the expanded portion 67, a size between the second wound portions 62B, 62C (namely, an outside size in a width direction of the guide portion 6 perpendicular to a longitudinal direction of the guide portion 6) at the tip portion 6a is larger than a size between the wound portions 62B, 62C at the base end.

Namely, in this description, "the expanded portion" indicates a position provided on the wound portions 61B, 62B, 62C around which the adhesive tape 8 as a fixing member is wound, and gradually expanded outward of the guide portion 6 as the guide portion 6 extends toward the tip portion 6a. Because the expanded portion 67 is provided on the guide portion 6, a size in a width direction of the guide portion 6 at the tip portion 6a is larger than that at the base end.

As shown in FIG. 3, the bottom wall portion 63 includes: a flexible portion 64 continued to the lower cover 4, and facing the base portion 61A; and a third wound portion 65 continued to the flexible portion 64, and facing the first wound portion 61B.

A thickness of the flexible portion 64 is thinner than that of the third wound portion 65. The flexible portion 64 is elastically deformable along the arrow K direction. Namely, the flexible portion 64 is elastically deformable both inward and outward of the guide portion 6. Further, as shown in FIG. 3, when the flexible portion 64 is not deformed (namely, in a neutral state), an inner radius of the guide portion 6 is so formed to fit in a minimum case of a radius of the electric wires 7, and the edges of the third wound portion 65 and the second wound portion 62B are overlapped with each other. Further, when the flexible portion 64 is deformed outward of the guide portion 6, the edges of the third wound portion 65 and the second wound portion 62B are not overlapped with each other, and the third wound portion 65 is pushed in a direction increasing the radius of the guide portion 6 by the electric wires 7.

Further, as shown in FIG. 3, when the flexible portion 64 is not elastically deformed (namely, in the neutral state), the size between the wound portions 61B, 65 along the arrow K direction (an outside size of the guide portion 6 in a width direction) at the tip portion 6a is smaller than that at the base end. However, according to the present invention, at least one size at the tip portion 6a among the sizes in the width direction of the guide portion 6 on the wound portions 61B, 62B, 62C, 65 around which the adhesive tape 8 is wound may be smaller than the size at the base end.

The ribs 66 are provided on a whole circumference of the wound portions 61B, 62B, 62C, 65. A plurality of ribs 6 are arranged from a position near the tip portion 6a of the guide portion 6 toward the box main body 2 with a gap. Namely, the rib 66 is not provided on the tip portion 6a of the guide portion 6. Further, the adhesive tape 8 is wound around the outer periphery of the ribs 66, and the ribs 66 prevent the adhesive tape 8 from being dislocated.

An assembling procedure of the electric junction box 1 will be explained. First, electric parts connected to ends of the electric wires 7 are mounted on the cassette block 5, and the cassette block 5 is received in the main body portion 3. Alternatively, after the cassette block 5 having the electric parts is received in the main body portion 3, ends of the electric wires 7 may be connected to the electric parts. Then, as shown in FIGS. 4 and 5, the other ends of the electric wires 7 connected to the electric parts are guided to an outside of the main body portion 3. Next, while the other ends of the electric wires 7 are guided to the outside of the main body portion 3, the lower cover 4 is moved close to the main body portion 3 for covering the bottom side of the main body portion 3. Then, edges of the gutter-shaped portion 60 and the bottom wall portion 63 in a circumferential direction are overlapped with each other, and the locking portion 41 of the lower cover 4 is locked with the lock-receiving portion 32 of the main body portion 3, thereby the guide portion 6 is assembled. At this time, the electric wires 7, of which one ends are connected to the electric parts, and the other ends are guided to the outside of the main body portion 3 (box main body 2), are passed through an inside of the guide portion 6. Further, while the electric wires 7 are passed through the inside of the guide portion 6, the adhesive tape 8 as the fixing member is continuously wound around an outer periphery of the wound portions 61B, 62B, 62C, 65 and the electric wires 7 from the wound portions 61B, 62B, 62C, 65 to the electric wires 7 without any gap. At this time, because the expanded portion 67 is provided on the second wound portion 61C, the adhesive tape 8 is wound around the outer periphery of the expanded portion 67. Further, because the ribs 66 are provided on the wound portions 61B, 62B, 62C, 65, the adhesive tape 8 is wound around the outer periphery of the ribs 66. Lastly, the locking portion of the upper cover is locked with the lock-receiving portion 31 of the main body portion 3, thereby the box main body 2 is assembled, and at the same time, the electric junction box 1 is assembled.

According to this embodiment, because the expanded portion 67 gradually expanded toward an outside of the guide portion 6 as the guide portion 6 is extended from the box main body 2 to the tip portion 6a away from the box main body 2 is provided on the guide portion 6, for example, even when the adhesive tape 8 continuously wound from the guide portion 6 to the electric wires 7 is tried to be moved in a direction away from the box main body 2 due to a vibration of a running vehicle, the expanded portion 67 prevents the adhesive tape 8 from being moved. Therefore, by preventing the adhesive tape 8 as the fixing member from being moved (slipped), the electric junction box 1 having an enhanced watertight performance can be provided.

Further, because the ribs 66 are arranged near the tip portion 6a of the guide portion 6, and not arranged on the tip portion 6a, a step between the guide portion 6 and the electric wires 7 can be smaller than when the ribs 66 are arranged on the tip portion 6a. Therefore, by making the step smaller, the adhesive tape 8 can be easily wound from the guide portion 6 to the electric wires 7 continuously without any gap, and the electric junction box 1 can have more enhanced watertight performance.

According to this embodiment, the guide portion 6 is provided with the ribs 66. However, the present invention is not limited to this. The rib 66 may be not provided on the guide portion 6.

Further, according to this embodiment, the ribs 66 are provided on the wound portions 61B, 62B, 62C, 65 around the whole circumference of the guide portion 6. However, the present invention is not limited to this. The ribs 66 may be partially provided on the guide portion 6 as long as the ribs 66 are provided on the wound portions 61B, 62B, 62C, 65 and separated from the tip portion 6a.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electric junction box comprising:
   a box main body;
   a tubular guide portion projecting from the box main body and guiding a plurality of electric wires to an outside of the box main body, said tubular guide portion having an expanded portion gradually expanded toward an outside of the guide portion as the guide portion is extended from the box main body to a tip portion away from the box main body; and
   an adhesive tape as a fixing member continuously wound from the guide portion to the electric wires while the electric wires are passed through an inside of the guide portion,
   wherein the guide portion is provided with a plurality of ribs formed away from the tip portion along a direction in which the electric wires are passed, projecting outward from the guide portion and the adhesive tape being wound directly, in spirals, over the plurality of ribs, and wherein the rib is provided on a whole circumference of wound portions.

2. The electric junction box as claimed in claim 1, wherein the guide portion includes: a gutter-shaped portion extended from an edge of a bottom side of the main body portion; and a bottom wall portion extended from an edge of a lower cover which is overlapped with the edge of the bottom side of the main body portion, and wherein when the lower cover is attached to the main body portion, edges of the gutter-shaped portion and the bottom wall portion in a circumferential direction are overlapped with each other to compose the rectangular-tubular-shaped guide portion.

3. The electric junction box as claimed in claim 2, wherein the gutter-shaped portion includes: a plate-shaped ceiling wall portion; and a pair of plate-shaped side wall portions extended from both edges of the ceiling wall portion in a circumferential direction, and arranged with a gap to each other.

4. The electric junction box as claimed in claim 3,
wherein the ceiling wall portion includes: a base portion continued to the main body portion; and a first wound portion continued to the main body portion away from the box main body, and
wherein the first wound portion is inclined in a direction separating from the lower cover and approaching the upper cover as the first wound portion extends from a base end of the first wound portion near the box main body to a tip portion of the first wound portion away from the box main body.

5. The electric junction box as claimed in claim 4,
wherein the pair of side wall portions respectively includes: a pair of second base portions continued to the base portion; and a pair of second wound portions continued to both the base portion and the second base portions and the first wound portion, and
wherein respective edges of the second wound portions away from the ceiling wall portion are inclined in a direction approaching the ceiling wall portion as the edges of the second wound portions extend from base ends of the second wound portions near the box main body to the tip portion.

6. The electric junction box as claimed in claim 5,
wherein one of the second wound portions is provided with the expanded portion gradually expanded toward an outside of the guide portion as the second wound portion is extended from the base end of the second wound portion to the tip portion, and
wherein an outside size in a width direction of the guide portion perpendicular to a longitudinal direction of the guide portion at the tip portion is larger than a size between the second wound portions at the base end of the second wound portion.

7. The electric junction box as claimed in claim 6, wherein the expanded portion is formed on wound portions, and a size in a width direction of the guide portion at the tip portion is larger than that at the base ends of the second wound portions.

8. The electric junction box as claimed in claim 1, wherein the expanded portion is formed on wound portions, and a size in a width direction of the guide portion at the tip portion is larger than that at the base ends of the wound portions.

9. The electric junction box as claimed in claim 2,
wherein the bottom wall portion includes: a flexible portion continued to the lower cover; and a third wound portion continued to the flexible portion,
wherein a thickness of the flexible portion is elastically deformable both inward and outward of the guide portion,
wherein when the flexible portion is not deformed, an inner radius of the guide portion is formed to fit in a minimum case of a radius of the electric wires, and
wherein when the flexible portion is deformed outward of the guide portion, and the third wound portion is pushed in a direction increasing the radius of the guide portion by the electric wires.

* * * * *